No. 621,283. Patented Mar. 14, 1899.
C. PULFRICH.
TERRESTRIAL TELESCOPE.
(Application filed Dec. 1, 1897.)
(No Model.) 3 Sheets—Sheet 1.

Witnesses:

Inventor:
Carl Pulfrich

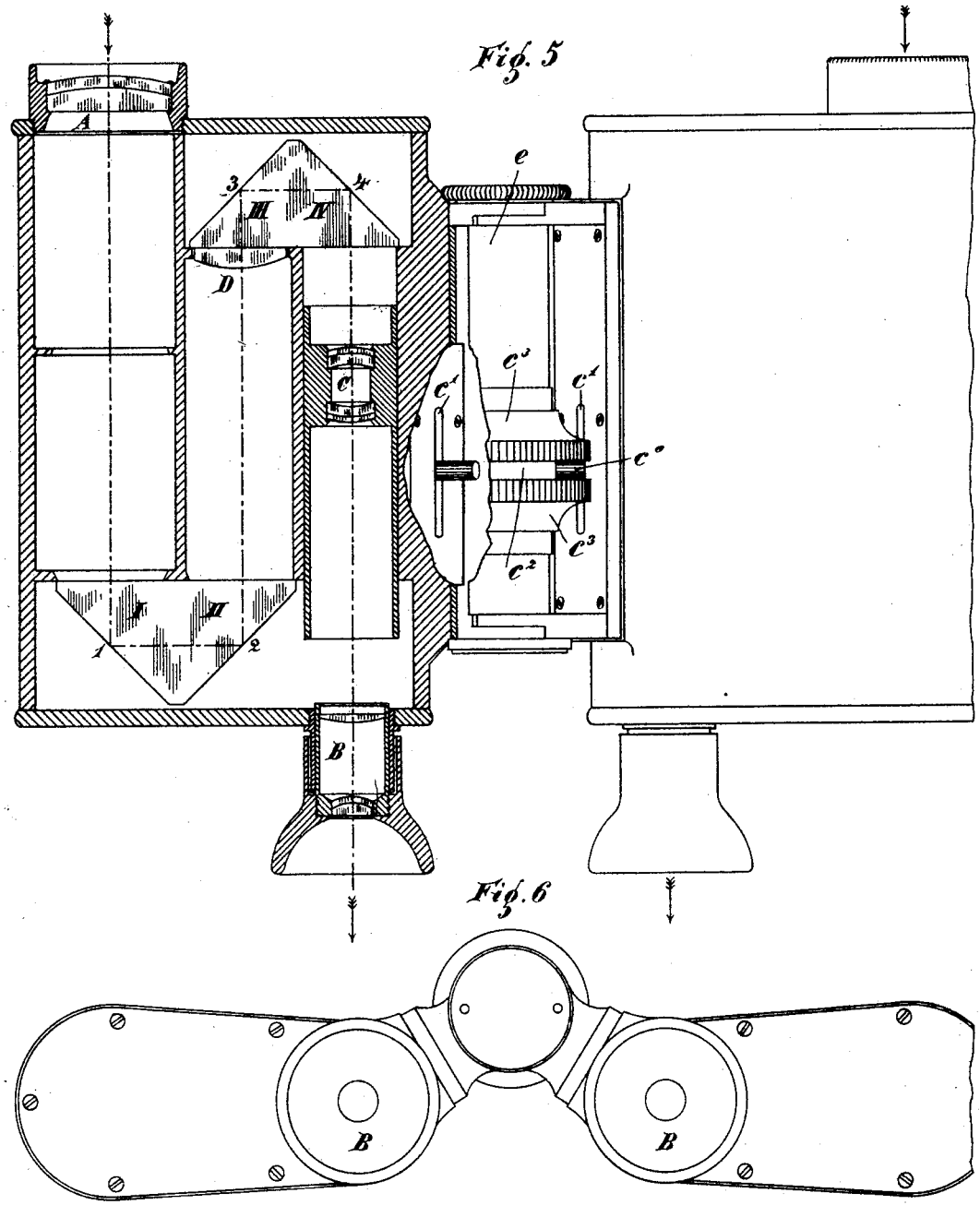

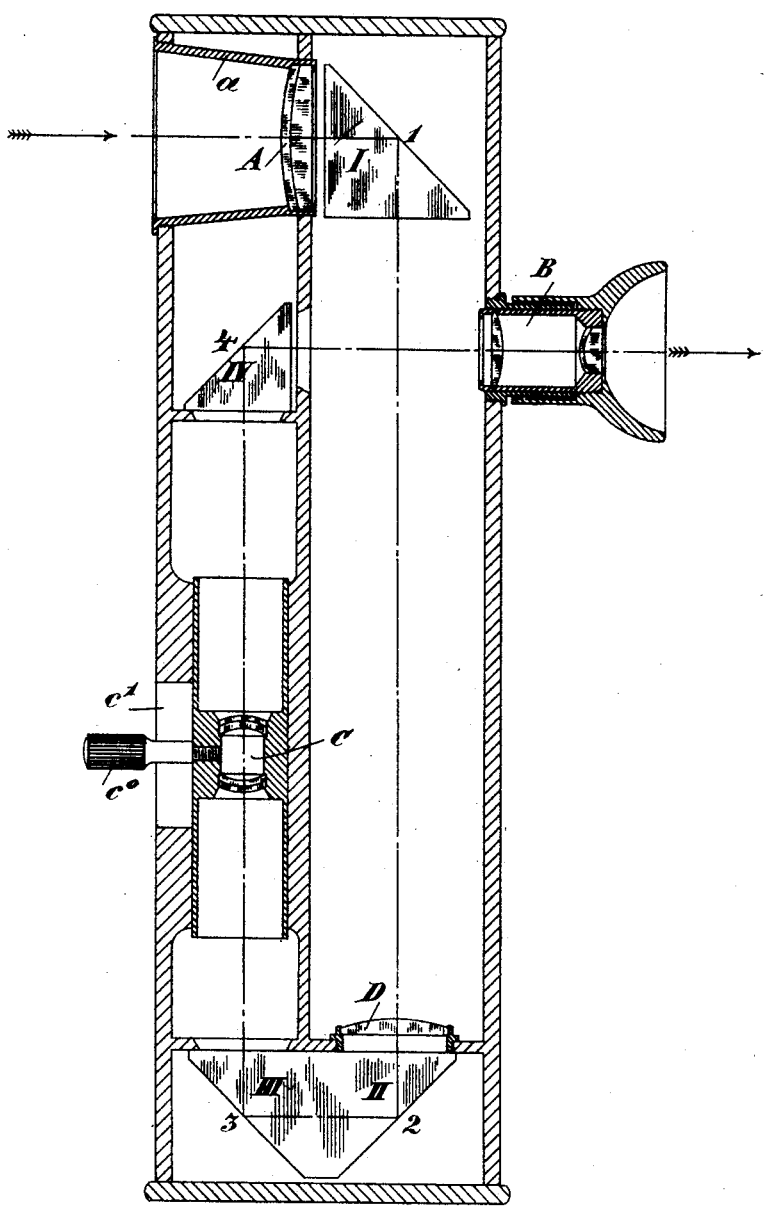

UNITED STATES PATENT OFFICE.

CARL PULFRICH, OF JENA, GERMANY, ASSIGNOR TO THE FIRM CARL ZEISS, OF SAME PLACE.

TERRESTRIAL TELESCOPE.

SPECIFICATION forming part of Letters Patent No. 621,283, dated March 14, 1899.

Application filed December 1, 1897. Serial No. 660,384. (No model.)

*To all whom it may concern:*

Be it known that I, CARL PULFRICH, doctor of philosophy, a subject of the King of Prussia, Emperor of Germany, residing at Jena, in the Grand Duchy of Saxe-Weimar, German Empire, have invented a new and useful Terrestrial Telescope, (for which I have obtained patents in France, No. 263,997, dated February 12, 1897; in Great Britain, No. 3,956, dated February 13, 1897, and in Switzerland, No. 13,894, dated February 11, 1897,) of which the following is a specification.

Porro has substituted in the telescope named after him for the combination of lenses which, in the so-called "terrestrial" telescope, restores the inverted image to an erect position a combination of prisms whereby the advantage of a considerably shorter telescope is obtained. This effect of Porro's combination of prisms for inverting an image or erecting an inverted image is caused by the circumstance that the optical axis of the telescope is broken by the prisms four times, each time through an angle of ninety degrees, in such successive directions that fractions of it are parallel to each other and at the same time are arranged not behind one another, but one next to the other. For certain purposes, however, Porro's telescope cannot replace the terrestrial telescope, because its magnifying power can be altered only by the eyepiece being replaced by another of a different focal length, whereas in the ordinary terrestrial telescope the magnifying power can be altered simply by moving the combination of lenses used for erecting the image in the direction of the optical axis.

According to the present invention the last-named advantage of the ordinary terrestrial telescope and the advantage of a more compact form of Porro's telescope are combined in one instrument by adding to the optical elements of the first telescope a combination of four prisms, which, like Porro's combination, by four times at angles of ninety degrees deflecting the optical axis causes parts of the said axis to lie parallel to and side by side with each other, but which, unlike Porro's combination, does not invert the image.

Figure 1:
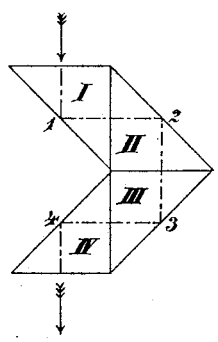
Figure 2:
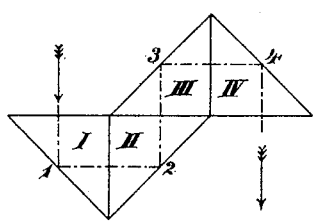
Figure 3:
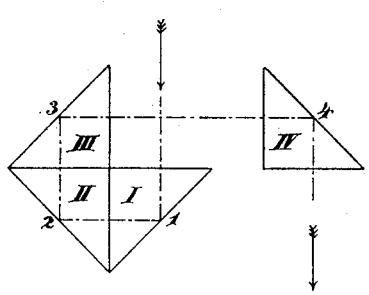
Figure 4:
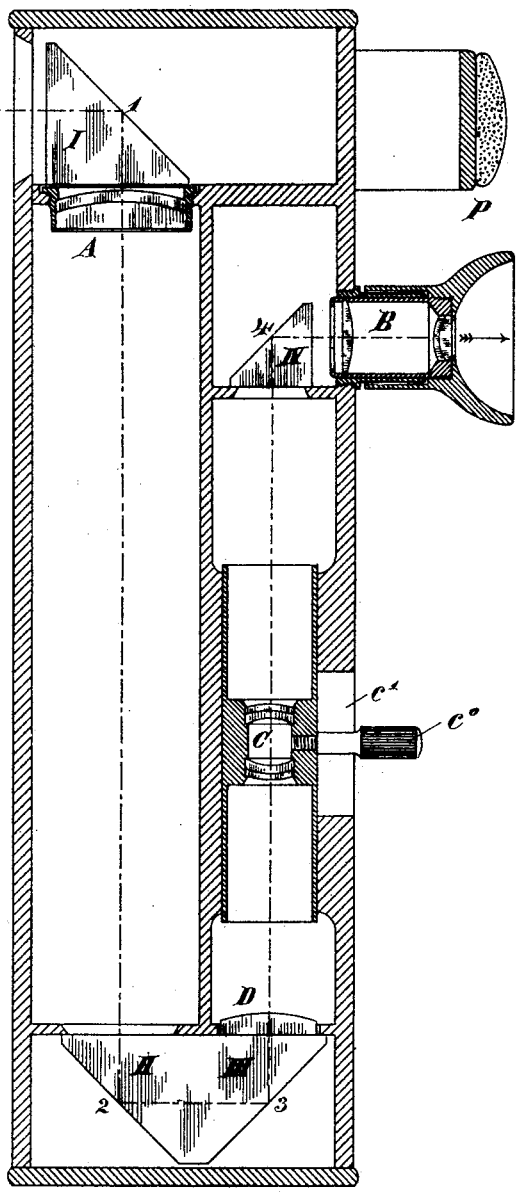

Figures 1, 2, and 3 of the accompanying drawings illustrate the three combinations each of four prisms I, II, III and IV, which satisfy these requirements. Fig. 4 represents a single telescope. Figs. 5 and 6 represent a binocular telescope; and Fig. 7 represents another single telescope, each separate telescope being provided with a system of prisms of the above kind.

The systems of prisms shown in Figs. 1, 2, and 3 have the property, which is advantageous in practice, that they leave the optical axis in one plane, which properly constitutes a second difference between the three primary forms of the combination of prisms according to the present invention and the two primary forms of Porro's combination. The primary forms (shown in Fig. 1) also have a third different feature, which for some purposes is very advantageous, this third feature being that the direction of the axial ray entering the first prism coincides with that of the axial ray coming out from the last prism. It is, however, sufficient to move in Fig. 1 one of the prisms I and IV away from the double prism II III in the direction 2 1 or 3 4 for obtaining the lateral displacement (characteristic for Porro's combination) of the rays coming out from the combination of prisms relatively to the entering rays—that is to say, to obtain an eccentricity of the axis of the eyeglass relatively to the axis of the object-glass. This latter property can therefore be given to a terrestrial telescope with any of the three primary forms of the combination of prisms, and as the combination of two telescopes into one double telescope having a greater distance between the object-glasses than between the eyeglasses, and by consequence having an increased stereoscopic effect, is dependent on this property it is possible to combine two terrestrial telescopes provided with either of the three primary forms of the new combination of prisms in such a double telescope.

From each of the three primary forms indicated in Figs. 1, 2, and 3 new and different forms may be developed by moving separate prisms in the manner already described with reference to Fig. 1. Such adjacent elements of the combination which are in contact may be secured to each other or made in one piece.

A single telescope of the new kind provided with a combination of prisms which is developed from the primary form of Fig. 1 is illustrated in Fig. 4 in section taken in the plane of the optical axis. A double telescope in which the distance between the object-glasses is greater than between the eyeglasses, provided with a combination of prisms which is developed from the primary form of Fig. 2, is shown in central section in Fig. 5 and in plan in Fig. 6. A single telescope provided with a combination of prisms which is developed from the primary form of Fig. 3 is shown in Fig. 7 in section through the axis.

The single telescope in Fig. 4 comprises an object-glass A and an eyeglass B, with a lens C for erecting the image, and a condenser D. Of the four elements of the combination of prisms in Fig. 1 the prism I is arranged in front of the object-glass A, the prisms II and III, made in one piece, are placed between the object-glass and the condenser D, and the prism IV is placed between the erecting-lens C and the eyeglass B. The arrangement of the series of prisms relatively to the series of lenses, as shown in Fig. 4, presents practical advantages; but of course if the consecutive order of the lenses and the consecutive order of the prisms be maintained the order in which these optical elements are arranged in the telescope may be variously altered without affecting the object of the invention. The same applies to the two other constructions hereinafter described. The condenser D is cemented unto the adjoining surface of the prism III; but of course it may be mounted separately. The instrument is held to the eye in the vertical position indicated in the drawings, its lower end being used as a handle and its upper end resting, with its pad P, against the forehead. By means of a stud $c^0$, secured to the mounting of the lens C and guided in a slot $c'$ of the casing, said lens C may be moved in the direction of the optical axis for the purpose of altering the magnifying power.

The binocular telescope, Figs. 5 and 6, has in each member the same lenses as the telescope just described, the series of prisms used corresponding to the primary form represented in Fig. 2. The prisms I and II and also the prisms III and IV are made as double prisms, and the former of these double prisms I II is placed between the object-glass A and the condenser D and the second prism is placed between the condenser-lens D and the erecting-lens C. The condenser D is shown as being cemented unto the double prism III IV. The observer can alter the distance between the eyeglasses to make it equal to the distance between his eyes by turning the tubes or telescopes about their common hinge-bolt $e$. By this hinge the instrument is also capable of being folded like a book. The hinge-bolt is further provided with a device for simultaneously moving both erecting-lenses C, which consists of the nut $c^3$, screwed on a threaded part of the bolt and having a circular groove $c^2$, which engages the two studs $c^0$, secured to the mountings of the said erecting-lenses C.

The single telescope represented in Fig. 7 combines the usual lenses, the object-glass A, the eyeglass B, the erecting-lens C, and the condenser D, with a combination of four prisms which is developed from the primary form illustrated in Fig. 3. The prism I is placed between the object-glass A and the condenser D, the prisms II and III, which are combined into a double prism, between the condenser D and the erecting-lens C, and the prism IV between the lens C and the eyeglass B. The mounting $a$ of the object-glass A acts as a shade in consequence of the great distance of its outer aperture from the lens.

What I claim as my invention, and desire to secure by Letters Patent of the United States, is—

The combination with a terrestrial telescope a telescope provided with a lens system for erecting the inverted image having means for altering the magnifying power by moving the erecting-lens system, of four reflecting-prisms adapted to deflect the optical axis four times at angles of ninety degrees in the same plane and in such a way, that parts of the broken axis are situated side by side, substantially as and for the purpose set forth.

In testimony whereof I have hereunto set my hand in the presence of two subscribing witnesses.

CARL PULFRICH.

Witnesses:
RUDOLPH FRICKE,
B. H. WARNER, Jr.